United States Patent [19]

Miyabayashi et al.

[11] Patent Number: 4,880,890

[45] Date of Patent: * Nov. 14, 1989

[54] ONE-CAN THERMOSETTING RESIN COMPOSITIONS AND PRECOATED METAL

[75] Inventors: Shigeaki Miyabayashi, Kobe; Yoshikatsu Matsuura, Minoo; Hiroshi Kanai, Kimitsu; Joji Oka, Tokyo, all of Japan

[73] Assignees: Takeda Chemical Industries Ltd., Osaka; Nippon Steel Corporation, Tokyo, both of Japan

[*] Notice: The portion of the term of this patent subsequent to Feb. 16, 2005 has been disclaimed.

[21] Appl. No.: 200,377

[22] Filed: May 31, 1988

[30] Foreign Application Priority Data

May 29, 1987 [JP] Japan .................................. 62-137155

[51] Int. Cl.$^4$ .............................................. C08G 18/80
[52] U.S. Cl. ..................................... 528/45; 428/425.8
[58] Field of Search ...................... 528/45; 428/425.8

[56] References Cited

U.S. PATENT DOCUMENTS

| | | | |
|---|---|---|---|
| 4,389,457 | 6/1983 | Panze et al. | 528/45 |
| 4,395,529 | 7/1983 | Panandiker et al. | 528/45 |
| 4,550,154 | 10/1985 | Kardemenos | 528/45 |
| 4,562,714 | 1/1986 | Tanaka et al. | 528/45 |
| 4,649,067 | 3/1987 | Gras | 528/45 |
| 4,725,661 | 2/1988 | Miyabayashi | 528/45 |

Primary Examiner—John Kight
Assistant Examiner—Dennis R. Daley
Attorney, Agent, or Firm—Wenderoth, Lind & Ponack

[57] ABSTRACT

A one-can thermosetting resin composition comprising (A) a blocked product of hexamethylene diisocyanate or bis(isocyanatomethyl)cyclohexane, or a blocked product of an adduct of hexamethylene diisocyanate or bis(isocyanatomethyl)cyclohexane and (B) a polyester polyol having at least three functional groups, gives tough coating films in yellowing and thermal degradation, and also exhibits increased hardness as well as high flexibility, stain resistance and chemical resistance. Especially, when the resin composition is used for preparing precoated metals, it gives good steel plates, thus being advantageously utilized for, among others, light electric appliances.

11 Claims, No Drawings

ONE-CAN THERMOSETTING RESIN COMPOSITIONS AND PRECOATED METAL

The present invention relates to one-can thermosetting resin compositions which are excellent in film performance and are especially good subsequent fabrication requiring high flexural strength, particularly it relates to resin compositions useful as a coating of steel plate e.g. precoated metal.

In general, precoated metal is optionally shaped for ultimate use. after applying a coating to a metal plate such as galvanized steel, which is used for, for example, metal framing materials including light electric appliances such as refrigerators, washing machines, electric stoves, etc. as well as vending machines, business machines, food display cases, etc. Such precoated metal as above, as compared with the post-coating process in which, after a metal plate is shaped into a complicatedly shaped article, a coating is applied thereon, has such advantages as rationalization of the coating process, uniform quality, saving of the volume of a coating material consumed, etc., and, therefore, enlargement of the field of use of such precoated metals is expected.

The coating to be applied onto precoated metal plate is required, because precoated metal plate is processed into shapes corresponding to such uses as enumerated above after formation of coating film, to keep extensibility as well as adhesion onto the metal surface enough to be resistant to fabrication such as bending, rolling, embossing pressure, drawing, etc. On the other hand, for articles thus shaped are required adequate properties corresponding to the respective ultimate uses, for example, in the case of exterior building panel, a high weatherability and a strong corrosion-resistance covering also the fabricated parts, and, in the case of household electrical appliances such as refrigerators, scarring-resistance and staining resistance. Besides these properties, depending on uses, service durability such as gloss, water resistance, chemical resistance, moisture resistance, etc. is further required.

For such household electrical appliances mentioned above, have been used aminoalkyd resins, melamine-curing acrylic polyols or epoxy resins. These resins are poor in flexibility of the film, and they give rise to cracking on the coating films when bended at an angle of 90° or more.

While a method of preparing pre-coated metal by coating a metal plate with a composition comprising a blocked product of bis(isocyanatomethyl)cyclohexane or its adduct and polyol resin and heating thus coated metal plate to cause the coated material to cure has also been known (Toku-Kai Sho 56-89548), precoated metal thus obtained dose not necessarily satisfy all of such properties as mentioned above.

Further, another method of preparing precoated metal plate with a composition comprising an isocyanate compound blocked with ethyleneimine and polyol resin and heating thus coated metal plate to cause the coated material to cure has also been known (Toku-Kai Sho57-10375), but precoated metal thus obtained does not satisfy all of such properties as described above.

It has been a remarkably difficult problem to improve the performance of coating films while keeping good balance of processability on bending, staining resistance and hardness. The object of the present invention is to provide a resin composition yielding excellent coating films having good balance of processability on bending, staining resistance and hardness and also excellent in other film properties.

The present inventors diligently carried out extensive research work for preparing resin compositions showing excellent film performance and, as a result, found out that, by combination of a blocked prodcut of a specific polyisocyanate with a polyester polyol having at least three functional groups, coating films having good processability on bending, superior hardness and also excellent chemical resistance as well as staining resistance can be be provided. Based on the above findings, was accomplished the present invention.

More specifically, the present invention relates to:

1. a one-can thermosetting resin composition comprising (A) a blocked product of hexamethylene diisocyanate or bis(isocyanatomethyl)cyclohexane, or a blocked product of an adduct of hexamethylene diisocyanate or bis(isocyanatomethyl)cyanohexane and (B) a polyester polyol having at least three functional groups, and 2. precoated metal, which is prepared by coating a metal plate with a one-can thermosetting resin composition comprising (A) a blocked product of hexamethylene diisocyanate or bis(isocyanatomethyl)cyclohexane or a blocked prodcut of an adduct of hexamethylene diisocyanate or bis(isocyanatomethyl)cyclohexane and (B) a polyester polyol having at least three. functional groups, and heating the thus coated metal plate to cause the coated material to cure.

The blocked product (A) to be employed in the present invention is exemplified by that of hexamethylene diisocyanate (hereinafter referred to as HDI) or bis-(isocyanatomethyl)cyclohexane(hereinafter referred to as $H_6XDI$) or that of a prepolymer having an NCO group at the terminal obtained by the reaction of either one of them with an active hydrogen compound. Examples of $H_6XDI$ include 1,2-bis(isocyanatomethyl)cyclohexane, 1,3-bis(isocyanatomethyl)cyclohexane, 1,4-bis(isocyanatomethyl)cyclohexane and a mixture thereof.

The prepolymers having terminal NCO groups obtained by the reaction of these diisocyanates with the active hydrogen compound can be produced by allowing the above-mentioned isocyanate monomer to react with the active hydrogen compound in the state of excess amount of the isocyanate groups.

The active hydrogen compound employable for preparing this prepolymer is exemplified by a low-molecular-weight polyol, e.g. a divalent alcohol such as ethylene glycol, propylene glycol, 1,2-butylene glycol, 1,3-butylene glycol, 1,6-hexanediol, diethylene glycol, dipropylene glycol, neopentyl glycol, neopentyl glycol ester of hydroxy pivalic acid, triehtylene glycol, hydrogenated bisphenol A, xylylene glycol, 1,4-butylene glycol, etc., a trivalent alcohol such as glycerin, trimethylol ethane, trimethylol propane, 1,2,6-hexanetriol, etc., a tetravalent alcohol such as pentaerythritol, etc.; polyether polyol such as propylene oxide or ethylene oxide adducts of the above-mentioned polyol; and a high-molecular-weight polyol such as polyester polyol obtainable by allowing the above-mentioned low-molecular-weight polyol to react with dicarboxylic acid or that modified with fatty acid.

These polyols may be used alone or as a mixture.

The prepolymer can be prepared by conducting the reaction with the equivalent ratio of NCO/OH within the range of about 2.0 to 15, preferably about 4 to 8, usually at 40° to 140° C., preferably at 70° to 100° C., followed by, upon necessity, removing unreacted isocyanate monomer by means of conventional thin-film distillation or extraction. This reaction can be carried out in the presence of an organometallic catalyst such as tin-, lead-, zinc- or iron-type one. The prepolymer is exemplified by biuret compounds obtainable by allowing an excess of the above-mentioned isocyanate monomer to react with water or a low molecular weight amine such as, ethylenediamine; allophanate compounds obtainable by allowing an excess isocyanate monomer to react with the above-mentioned low-molecular-weight polyol or high-molecular-weight polyol; and further by dimers or trimers obtainable by subjecting an isocyanate monomer to reaction by using a known catalyst for dimerization or trimerization of an organic diisocyanate.

The afore-mentioned blocked isocyanate monomers or blocked prepolymers thereof can be obtained by allowing an isocyanate monomer or a prepolymer thereof to react with a blocking agent by a conventional process. As the blocking agent, use may be made of any of blocking agents known to be employable for the blocking of isocyanates such as those based on phenol, lactam, active methylene, alcohol, mercaptan, acid amide, imide, amine, imidizole, urea, carbamic acid salt, imine, oxime and sulfite. Among them, the blocking agents based on phenol, oxime, lactam and imine are advantageously employed. As specific examples of the blocking agent, there may be mentioned the following:

Blocking agents based on phenol:
Phenol, cresol, xylenol, nitrophenol, chlorophenol, ethylphenol, p-hydroxydiphenyl, t-butylphenol, o-isopropylphenol, o-sec-butylphenol, p-nonylphenol, p-t-octylphenol, hydroxybenzoic acid, hydroxybenzoic acid ester, etc.

Blocking agents based on lactam:
ε-Caprolactam, δ-valerolactam, γ-butyrolactam, β-propiolactam, etc. Blocking agents based on active methylene:

Diethyl malonate, dimethyl malonate, ethyl acetoacetate, methyl acetoacetate, acetylacetone, etc.

Blocking agents based on alcohol:
Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol, methoxymethanol, glycolic acid, glycolates such as methyl glycolate, ethyl glycolate and butyl glycolate, lactic acid, lactic acid esters such as methyl lactate, ethyl lactate and butyl lactate, methylol urea, methylolmelamine, diacetone alcohol, ethylene chlorohydrin, ethylene bromohydrin, 1,3-dichloro-2-propanol, ω-hydroperfluoroalcohol, acetone cyanohydrin, etc.

Blocking agents based on mercaptan:
Butylmercaptan, hexylmercaptan, t-butylmercaptan, t-dodecylmercaptan, 2-mercaptobenzothiazole, thiophenol, methylthiophenol, ethylthiophenol, etc. Blocking agents based on acid amide:

Acetanilide, acetanisidide, acetotoluide, acrylamide, methacrylamide, acetamide, stearic acid amide, benzamide, etc. Blocking agents based on imide:

Succinimide, phthalimide, maleimide, etc. Blocking agents based on amine:

Diphenylamine, phenylnaphthylamine, xylidine, N-phenylxylidine, carbazole, aniline, naphthylamine, butylamine, dibutylamine, butylphenylamine, etc. Blocking agents based on imidazole:

Imidazole, 2-ethylimidazole, etc. Blocking agents based on urea:

Urea, thiourea, ethylene urea, ethylene thiourea, 1,3-diphenyl urea, etc. Blocking agents based on carbamate:

Phenyl N-phenylcarbamate, 2-oxazolidone, etc. Blocking agents based on imine:

Ethyleneimine, propyleneimine, etc. Blocking agents based on oxime:

Formamidoxime, acetaldoxime, acetoxime, methyl ethyl ketoxime, diacetylmonoxime, benzophenoneoxime, cyclohexanoneoxime, etc. Blocking agents based on sulfite:

Sodium bisulfite, potassium bisulfite, etc.

Examples of practical procedures of conducting the above-mentioned reaction between an isocyanate monomer or a prepolymer thereof and a blocking agent include a procedure of reacting an isocyanate monomer or its prepolymer with a blocking agent at an NCO/active hydrogen groups in the blocking agent equivalent ratio of about 0.90 to 1.0, preferably about 0.95 to 1.0; a procedure which comprises allowing an isocyanate monomer to react with a blocking agent at an equivalent ratio of NCO/active hydrogen groups in the blocking agent being about 1.1 to 3.0, preferably about 1.2 to 2.0, followed by further reaction with such low-molecular-weight polyol, high-molecular-weight polyol, water or low molecular weight amine as usable in the above-mentioned prepolymer production; or a procedure which comprises allowing an isocyanate monomer to react with a low-molecualr-weight polyol, a high-molecular-weight polyol, water or a low xolecular weight amine at an NCO/active hydrogen equivalent ratio of about 1.5 to 10.0, preferably about 2.0 to 7.0, followed by further reaciton with a blocking agent.

Each of the above-mentioned reactions is carried out by a conventional procedure in the presence or absence of a solvent having no active hydrogen (e.g. aromatic ones such as benzene, toluene, xylene, etc., petroleum solvents such as Solvesso-100, Solvesso-200, etc., esters such as ethyl acetate, butyl acetate, etc., ketones such as acetone, methyl ethyl ketone, methyl isobutyl ketone, cyclohexanone, etc., ethers such as tetrahydrofuran, or the like). In conducting the reaction, a known catalyst such as tertially amine, an organometallic compound or the like may be used.

The polyester polyol having at least three functional groups (B) to be employed in the present invention can be prepared by subjecting to esterification dicarboxylic acid, glycol and polyol having at least three OH groups.

Examples of dicarboxylic acid to be employed for the production of polyester polyol include aromatic ones and alicyclic ones, i.e. succinic acid, succinic anhydride, adipic acid, azelaic acid, sebacic acid, dodecanoic acid, maleic acid, maleic anhydride, fumaric acid, itaconic acid, dimer acid, etc.; phthalic acid, phthalic anhydride, isophthalic acid, isophthalic acid dimethyl ester, terephthalic acid, terephthalic acid dimethyl ester, 2,6 naphthalenedicarboxylic acid, hexahydrophthalic anhydride, cyclohexane dicarboxylic acid dimethyl ester, methyl hexahydrophthalic andhydride, 3,6-endo-methylene-1,2,3,6-tetrahydro-cis-phthalicanhydride, methyl-3,6-endo-methylene-1,2,3,6-tetrahydro-cis-phthalic andhydride.

Examples of glycol include aliphatic ones, i.e. ethylene glycol, diethylene glycol, propylene glycol, 1,3 butylene glycol, 1,4 butylene glycol, dipropylene glycol, 1,5 pentane diol, 1,6-hexanediol, neopentyl glycol, neopentyl glycol ester of hydroxypivalic acid, triethylene glycol, 1,9-nonanediol, 3-methyl-1,5-pentanediol, 2,2,4-trimethyl-1,3 pentanediol, 2-ethyl-1,3 hexanediol, polycaprolactonediol, polypropylene glycol, polytetramethylene ether glycol, polycarbonae diol, 2-n-butyl 2-ethyl 1,3 propanediol, 2,2 diethyl 1,3 propanediol, etc.; and alicyclic ones or aromatic ones, i.e. cyclohexane dimethanol, cyclohexane diol, xylylene glycol, bishydroxyethyl terephthalate, 1,4 bis(2-hydroxyethoxy)-benzene, hydrogenated bisphenol A, ethylene oxide adduct of bisphenol A, propylene oxide adduct of bisphenol A, etc.

The polyol having at least three OH groups is exemplified by glycerin, trimethylolpropane, trimethylolethane, 1,2,6-hexanetriol, pentaerythritol, diglycerin and, besides, by ethylene oxide adducts, propylene oxide adducts or ε-caprolactone adducts prepared by using these polyols as initiators.

The esterificaiton is carried out by distilling off the condensate by a conventional means, and it is preferable to cease, in general, the reaction when the acid value of the product reaches 0.1 to 50, especially 1 to 20, for avoiding possible gelation due to the reaction when allowed to proceed too far, because the prodcut is a poly-functional one.

A concrete example of the esterification process comprises using dicarboxylic acid in an excess molar ratio to the glycol used, allowing the reaction to proceed until the acid value of the reaction product reaches a given value by distilling off the condensation water while blowing nitrogen gas into the reaction system at 180° to 260° C. to thereby obtain a polyester having COOH groups at both terminals, then adding a polyol having at least three OH groups so that the polyester may be OH-terminated, distilling off the condensation water in like manner and by ceasing the reaction when the acid value of the product reaches not exceeding 50, preferably in the range of 1 to 20.

And, when the dimethyl ester of dicarboxylic acid is employed, it is used in an amount of more than the mole number of glycol, and the condensate is distilled off under similar conditions to the above to thereby obtain a polyester having methyl ester groups at its both terminals, then, polyol having at least three OH groups is added to the reaction system and ester-exchange reaction is conducted under conditions similar to those described above to obtain polyester polyol.

In the case of using an acid anhydride combinedly, dicarboxylic acid is first used in an amount of less than the mole number of glycol, and the condensate is distilled off under conditions similar to those mentioned above to thereby obtain a polyester having OH groups at its both terminals, then dicarboxylic acid anhydride is added to the reaction system to cause ring-opening to thereby obtain a polyester having COOH groups at its both terminals.

Subsequently, a polyol having at least three OH groups is added to the reaction system, and the reaction is allowed to proceed in a manner similar to that described above to thereby obtain a polyester polyol.

The polyester polyol employable in the present invention has 3 to 7 functional groups, and especially preferable ones are those having 4 to 6 functional groups, whose number-average molecular weight is 600 to 3500 and the hydroxyl value ranges from 40 to 460. Use of a polyester polyol having not more than three OH groups gives, in some cases, lower hardness of cured film and insufficient chemical-resistance.

Use of a polyester polyol having more than 7 functional groups give in some cases, poor folding endurance. Use of a polyester polyol having a number-average molecular weight of not more than 600 gives poor gloss of cured film. Use of a polyester polyol having a number-average molecular weight of not less than 3500, the viscosity of the product becomes higher, causing a problem on coating workability, and, in some cases, the stain-resistance of the film becomes poor. Use of a polyester polyol having a hydroxyl value of not more than 40 causes, in some cases, poor chemical-resistance and stain resistance of the cured film. Use of a polyester polyol whose hydroxyl value exceeds 460 causes, in some cases, poor folding resistance of the coated film.

The one-can thermosetting resin composition of the present invention is a composition containing the above-mentioned blocked material (A) and polyester polyol (B).

The ratio of the above-mentioned component (A) and component (B) is about ½ to 2/1, especially preferably 0.8/1 to 1.2/1, in terms of OH/regenerated isocyanate groups equivalent ratio.

While the composition of the present invention can be used itself as clear coatings or adhesives, it may be supplemented, in addition to the above-mentioned components (A) and (B), depending upon necessity, with an organic solvent such as esters, e.g. ethyl acetate, butyl acetate, methyl acetoacetate, 2-ethoxyethyl acetate, etc., aromatic solvents, e.g. xylene, toluene, etc., ketones, e.g. methyl ethyl ketone, methyl isobutyl ketone, cyclohexanone, etc., ethers e.g. diethylene glycol dimethyl ether, etc.; petroleum solvents e.g. Solvesso-100, Solvesso-200, etc.; coloring pigments or extenders, dispersants of such type as silicone-, amine-, polyether-, polyester-, castor oil-, synthetic wax- or bentonite-; an antifoaming agent; a levelling agent, a thixotropic agent; a stabilizer of such type as benzotriazole-, hindered amine- or hindered phenol; a catalyst of such type as tin-, lead-, zinc- or iron-; etc.

The one-can thermosetting resin composition of the present invention obtained thus above is applied onto a substrate, which is then subjected to heating to thereby dissociate the blocking agent contained in (A) to regenerate NCO groups, and these regenerated NCO groups react with OH groups in (B) to give a cured film.

The resin composition of the present invention is used as coatings or adhesives, and especially it is advantageously used for preparing precoated metals.

The metal plate usable for preparation of precoated metals, normally, may be any one employed for pre-coated metal, which is exemplified by cold-rolled steel, galvanized steel, alloyed zinc-plated steel, tin-plated steel, chromium-plated steel, aluminium-plated steel, lead-plated steel, nickel-plated steel, aluminium plate, titanium plate, stainless steel plate, etc. The resin composition of the present invention is applied to these substrates directly or after conventional pre-treatment. In any of these cases, the resin composition of the present invention may be applied to these substrates, upon necessity, after they are precoated with a primer then being optionally dried. The pre-treatment includes chromating process, phosphating process, composite-oxide-film-forming process, etc. The chromating process is exemplified by electrolytic, spreading- and reacting-type. The phosphating process is exemplified by zinc-phosphating and iron-phosphating process. The composite-oxide-film-forming process includes a one in which the composite oxide contains nickel and cobalt.

As the primer can be used conventional ones of epoxy resin type, high molecular polyester type, or the like.

Shape and form of metal plates may be either flatplate shaped or cylindrical. On these metal plates is applied the resin composition of the present invention. The volume of the resin composition to be applied is not limitative but can be optionally decided, and, preferably, it is in a range of giving a thickness of about 10 to 30 $\mu$ of dried film.

As examples of the means of application, there may be mentioned spray-gun, roll coater, flow coater, etc.

Then, the coated metal plates ar heated for curing.

The heating temperature (heat metal temperature) varies with the kinds of blocking agents and is about 150° to 350° C., while the heating time is preferably in the range of about 20 to 120 seconds. Through such heating procedure, the blocking agent in the blocked material(A) dissociates to regenerate NCO groups react with OH groups in (B) to cause crosslinking, yielding tough coating films.

The film obtained by curing the one-can thermosetting resin composition of the present invention is completely freed of yellowing and thermal degradation. The film also exhibits increased hardness as well as high flexibility, stain resistance and chemical resistance. Especially, when the resin composition of the present invention is used for preparing precoated metals, it gives good steel plates, thus being advantageously utilized for, among others, light electric appliances.

The present invention is more specifically illustrated by the following Reference Examples and Working Examples. In the Examples, parts or % means parts by weight or weight % respectively.

PREPARATION OF POLYESTER POLYOL

Reference Example 1

A reaction vessel was charged with 3-methyl-1,5 pentadiol [319.7 parts(2.71 mol.)], phthalic anhydride[178.9 parts(1.21 mol.)] and dibutyltin dilaurate[0.1 part]. The mixture was heated to 220° C., into which was blown nitrogen gas, then the reaction was allowed to proceed while distilling off the condensation water. When the acid value reached 18.0, phthalic anhydride[357.8 parts(2.42 mol.)] was added to the reaciton system. The reaction was allowed to proceed for one hour after the reaction temperature reached 170° C. to obtain a COOH-terminated ester compound whose acid value was 177.0. To this compound were added trimethylol propane (hereinafter abbreviated as TMP)[244.3 parts(1.82 mol.)] and dibutyltin dilaurate [0.1 part]. The reaciton was then allowed to proceed in like manner while distilling off the condensation water to obtain a polyester polyol whose acid value was 9.9 and hydroxyl value was 103.0. This polyol was dissolved in cyclohexanone to give a solution containing a 40% solid portion.

Reference Example 2

A reaction vessel was charged with hydrogenated bisphenol A[364.9 parts(1.52 mol.)] and adipic acid[441.6 parts(3.02 mol.)]. The mixture was heated to 220° C., into which was blown nitrogen gas, then the reaction was allowed to proceed while distilling off the condensation water then produced. When the acid value of the reaction system reached 250.0, TMP [304.1 parts(2.27 mol.)] was added to the reaction mixture. The reaction was then allowed to proceed in like manner while distilling off the condensation water to obtain a polyester polyol whose acid value was 2.6 and hydroxyl value was 187.2. This polyol was dissolved in cyclohexanone to give a solution containing a 50% solid portion.

Reference Examples 3 to 7

Except for varying the amounts of the starting materials as shown in Table 1, reactions were carried out under conditions similar to those of Reference Example 2 to obtain the corresponding polyester polyols. In the table, numbers of "parts" required for obtaining 1000 parts of a solid portion of polyester polyol are shown.

Reference Example 8

A reaction vessel was charged with TMP[646.4 parts(4.82 mol.)] and adipic acid[469.4 parts(3.21 mol.)]. The mixture was heated to 220° C., into which was blown nitrogen gas, then the reaction was allowed to proceed while distilling off the condensation water to obtain a polyester polyol whose acid value was 3.8 and hydroxyl value was 446.1. This polyol was dissolved in cyclohexanone to give a solution containing a 50% solid portion.

Reference Example 9

A reaction vessel was charged with ethylene glycol[183.4 parts(2.95 mol.)] and succinic acid[664.7 parts(5.63 mol.)]. The reaction was allowed to proceed under the conditons similar to those of Reference Example 2. When the acid value of the reaction mixture reached 420.0, TMP[189.4 parts(1.41 mol.)] was added to the reaction system. Esterification was allowed to proceed continuously, and, when the acid value reached 170.0, ethylene glycol[183.4 parts(2.95 mol.)] was further added, and the condensation water was distilled off to leave a polyester polyol whose acid value was 1.5 and hydroxyl value was 215.5. This polyol was dissolved in cyclohexanone to give a solution containing a 60% solid portion.

Reference Example 10

A mixture of ethylene glycol[151.8 parts(2.45 mol.)] and succinic acid[550.0 parts(4.66 mol.)] was subjected to a reaction under the conditions similar to those of Reference Example 2. When the acid value reached 420.0, pentaerythritol [159.3 parts(1.17 mol.)] was added to the reaction system Esterification was then allowed to proceed, and when the acid value reached 165.0, pentaerythritol[159.3 parts(1.17 mol.)]and TMP[157.0 parts(1.17 mol.)] were further added to the reaction system, then the condensation water was distilled off to obtain a polyester polyol whose acid value was 3.8 and hydroxyl value was 447.8. This polyol was dissolved in cyclohexanone to give a solution containing a 50% solid portion.

PREPARATION OF BLOCKED PRODUCT

Reference Example 11

In Solvesso-100(400.0 parts) was dissolved 1,3 bis-(isocyanatomethyl)cyclohexane(241.6 parts), to which was added dropwise methyl ethyl ketoxime(180.6 parts) over a period of one hour. The mixture was then heated at 75° C. to 80° C. for one hour. To the reaction mixture were added dibutyltin dilaurate (0.6 part) and polyester polyol[prepared by conventional condensation of a mixture of adipic acid(876.6 parts), ethylene glycol(186.3 parts), TMP(201.2 pars) and dipropylene glycol (402.3 parts); acid value : 3.5, hydroxyl value : 172.0, solid portion : 100%)](177.0 parts), then the reaction was allowed to proceed at 75° C. to 80° C. for six hours to obtain a solution of blocked product whose regenerated-isocyanate-group-content was 8.5%, solid portion content was 60% and Gardner-Holdt viscosity (25° C.) was G~H.

Reference Example 12

A two-litre capacity four-necked flask was charged with Takenate D-160N[manufactured by Takeda Chemical Industries, Ltd., TMP-hexamethylene diisocyanate adduct, solid portion 75%, isocyanate content 13.2%, Gardner-Holdt viscosity(25° C.) J~K](760.7 parts) and cellosolve acetate(325.6 parts). To the mixture was added dropwise gradually methyl ethyl ketoxime (213.7 parts) under a blanket of nitrogen gas while maintaining the inner temperature at a range of from 60° C. to 70° C. Then, the reaction mixture was kept at the above-mentioned temperature range for about two hours to thereby obtain a solution of the blocked product. The solution contained a solid portion of 60%, regenerated isocyanate groups of 7.77% and its Gardner-Holdt viscosity (25° C) was Q~R.

Reference Example 13

In cyclohexanone(520.0 parts) was dissolved 1,3 bis-(isocyanatomethyl)cyclohexane(337.4 parts), to which was added dropwise methyl ethyl ketoxime(252.2 parts) over a period of one hour. The mixture was then heated at temperatures ranging from 75° C. to 80° C. for further one hour. To the reaction mixture were added dibutyltin dilaurate(0.4 part) and polyester polyol (the polyester polyol of Reference Example 9) (189.3 parts). The reaction was allowed to proceed for four hours at temperatures ranging from 75° C. to 80° C. to thereby obtain a solution of blocked product containing 9.3% of regenerated isocyanate group and 60% of a solid portion.

Reference Example 14

In cyclohexanone(520.0 parts) was dissolved hexamethylene diisocyanate(310.2 parts), to which was added dropwise methyl ethyl ketoxime(267.7 parts) over a period of one hour. The mixture was then heated at temperatures ranging from 75° C. to 80° C. for further one hour. To the reaction mixture were then added dibutyltin dilaurate (0.4 part) ad polyester polyol (the polyester polyol of Reference Example 9)(200.9 parts). The reaction was allowed to proceed for four hours at temperatures ranging from 75° C. to 80° C. to thereby obtain a solution of blocked product containing 9.9% of regenerated isocyanate group and 60% of a solid portion.

Reference Example 15

In a mixture of cyclohexanone(719.0 parts) and dimethylformamide(117.2 parts) was dissolved hexamethylene diisocyanate(225.5 parts). To the solution was added dropwise methyl ethyl ketoxime(238.3 parts) gradually not to allow the temperature of the reaction mixture to exceed 80° C. The reaction was then allowed to proceed for further four hours at temperatures ranging from 75° C. to 80° C. to obtain a solution of blocked product in which the content of regenerated isocyaate group was 8.6% and the content of solid portion was 35%.

Reference Example 16

In a mixture of Solvesso-100(473.1 parts) and methyl ethyl ketone(473.1 parts) was dissolved hexamethylene diisocyanate (261.4 parts). To the solution was added dropwise methyl ethyl ketoxime(225.7 parts) over a period of one hour. The mixture was then heated at temperatures ranging from 65° C. to 70° C. for further one hour. To the reaction mixture were then added 1,1,3,3-tetra-n-butyl-1,3 diacetoxydistannoxane (0.5 part) and polyester polyol(the polyester polyol used in Reference Example 11)(221.2 parts). The reaction was then allowed to proceed at temperatures ranging from 65° C. to 70° C. for six hours. Thus, a solution of blocked prodcut in which the content of regenerated isocyanate group was 6.6% and the content of solid portion was 43% was obtained.

Example 1

To a mixture of the polyester polyol solution obtained in Reference Example 1 (50.5 parts) and the blocked product of Reference Example 11 (18.3 parts) (NCO/OH equivalent ratio=1.0) was added titanium oxide(Tipaque R-820; Ishihara Sangyo Kaisha Ltd.)(31.2 parts) to have the pigment weight concentration(PWC) at 50%. To the mixture was further added, as the catalyst, 1,1,3,3-tetra-n-butyl-1,3-diacetoxydistannoxane (0.018 part). The whole mixture was sufficiently kneaded with a paint conditioner to give a white enamel solution. This solution was applied onto a 0.6 mm thick, surface-treated galvanized steel plate with electrolytic chromate treatment, followed by applying an epoxy resin primer with a bar coater to obtain a dried coating film thickness of 20μ, which was then baked in the atmosphere of 260° C. for 60 seconds, thereby yielding a glossy white coating film. The formulation of the white enamel and properties of the coating film are shown in Table 3.

Examples 2 to 17

Using blocked products obtained by Reference Examples 11 to 16, compositions, in which the total volume of white enamel solution of PWC=50% was 100 parts as shown in Table 3, were subjected to baking under conditions similar to those in Example 1.

TABLE 1

| | Polyester Polyol | Reference Example | | | | | | | | | |
| | | 1 | 2 | 3 | 4 | 5 | 6 | 7 | 8 | 9 | 10 |
| --- | --- | --- | --- | --- | --- | --- | --- | --- | --- | --- | --- |
| Amount of | Phthalic anhydride | 178.9 | | | | | | | | | |
| Starting | Adipic acid | | 441.6 | | | | | | 469.5 | | |
| Materials | Succinic acid | | | 552.6 | 535.0 | 503.0 | 328.4 | 566.8 | | 664.7 | 550.0 |
| Charged Parts | 3-Methyl 1,5-pentadiol | 319.7 | | | | | | | | | |
| | Hydrogenated bisphenol A | | 364.9 | | | | | | | | |
| | Ethylene glycol | | | | 152.5 | | | | | 183.4 | 151.8 |
| | Propylene glycol | | | | | 180.9 | | | | | |

TABLE 1-continued

|  | Polyester Polyol | Reference Example | | | | | | | | | |
|---|---|---|---|---|---|---|---|---|---|---|---|
|  |  | 1 | 2 | 3 | 4 | 5 | 6 | 7 | 8 | 9 | 10 |
|  | Neopentyl glycol |  |  |  |  | 232.9 |  |  |  |  |  |
|  | BA3G glycol* |  |  |  |  |  | 494.5 |  |  |  |  |
|  | 2,2-Diethyl 1,3 propanediol |  |  |  |  |  |  | 326.8 |  |  |  |
|  | Pentaetythritol |  |  |  |  |  |  |  |  |  | 318.6 |
|  | Phthalic anhydride | 357.8 |  |  |  |  |  |  |  |  |  |
|  | Trimethylol propane | 244.3 | 304.1 | 470.9 | 455.9 | 428.9 | 279.8 | 483.0 | 649.4 | 189.4 | 157.0 |
|  | Ethylene glycol |  |  |  |  |  |  |  |  | 183.4 |  |
| Properties of Polyestr Polyol | Acid value | 9.9 | 2.6 | 5.5 | 5.5 | 3.6 | 0.8 | 3.1 | 3.8 | 1.5 | 3.8 |
|  | Hydroxyl value | 103.0 | 187.2 | 334.1 | 321.9 | 273.8 | 190.2 | 291.9 | 446.1 | 215.5 | 447.8 |
|  | Number of functional groups | 5 | 5 | 5 | 5 | 5 | 5 | 5 | 5 | 3 | 7 |
|  | Number-average molecular weight | 2484 | 1478 | 826 | 857 | 1011 | 1469 | 951 | 623 | 776 | 870 |
| Properties of Resin Solution | Diluent | Cyclo-hexanone | Cyclo-hexanone | Cyclo-hexanone | Cyclo-hexanone | Cyclo-hexanone | Cyclo-hexanone | Cyclo-hexanone | Cyclo-hexanone | Cyclo-hexanone | Cyclo-hexanone |
|  | Non-volatile content(%) | 40 | 50 | 50 | 50 | 50 | 50 | 50 | 50 | 50 | 50 |
|  | Acid value | 4.0 | 1.3 | 2.8 | 2.8 | 1.8 | 0.4 | 1.6 | 1.9 | 0.9 | 1.9 |
|  | Hydroxyl value | 41.2 | 93.6 | 167.1 | 161.0 | 136.9 | 95.1 | 146.0 | 223.1 | 129.3 | 223.9 |
|  | Gardner-Holdt viscosity(25° C.) | C | R~S | H~I | G~H | G~H | Q~R | G~H | E~F | H~I | V~W |

*Ethylene oxide adduct of bisphenol A manufactured by Nihon Nyukazai, Ltd.
Hydroxyl value :317.0

TABLE 2

|  |  | Reference Example | | | | | |
|---|---|---|---|---|---|---|---|
|  |  | 11 | 12 | 13 | 14 | 15 | 16 |
| Properties of resin solution | Non-volatile content (%) | 60 | 60 | 60 | 60 | 35 | 43 |
|  | Gardner-Holdt viscosity (25° C.) | G~H | Q~R | Q~R | E~F | A-4~A-5 | A-4 |
|  | Regenerated isocyanate (%) | 8.50 | 7.77 | 9.3 | 9.9 | 8.6 | 6.6 |

TABLE 3

| | | Working Examples | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Formulation of White Enamel | Polyester polyol (No. of Reference Example) | 1 | 2 | 3 | 4 | 5 | 6 | 7 | 8 | 3 | 2 | 9 | 3 | 2 | 1 | 3 | 1 | 10 |
| | Amount of polyester polyol (parts) | 50.0 | 35.5 | 25.9 | 26.5 | 29.1 | 35.2 | 28.1 | 21.5 | 24.5 | 34.0 | 30.6 | 27.4 | 36.9 | 52.7 | 28.8 | 48.3 | 19.5 |
| | Blocked product (Reference Ex.) | 11 | 11 | 11 | 11 | 11 | 11 | 11 | 11 | 12 | 12 | 13 | 13 | 13 | 14 | 15 | 16 | 16 |
| | Amount(parts) | 18.3 | 29.2 | 38.2 | 37.6 | 35.2 | 29.5 | 36.1 | 42.3 | 39.5 | 30.6 | 31.9 | 36.8 | 27.8 | 16.4 | 42.0 | 22.6 | 49.5 |
| | Amount of titanium oxide used (parts) | 31.2 | 35.3 | 35.9 | 35.8 | 35.7 | 35.3 | 35.7 | 36.1 | 36.0 | 35.4 | 37.5 | 35.8 | 35.2 | 30.9 | 29.1 | 29.1 | 31.0 |
| | Amount 1,1,-3,3 tetra n-butyl 1,3 di-acetoxydistannoxane added (parts) | 0.018 | 0.029 | 0.038 | 0.038 | 0.035 | 0.029 | 0.036 | 0.042 | 0.039 | 0.031 | 0.031 | 0.037 | 0.028 | 0.016 | 0.042 | 0.023 | 0.049 |
| Film Performance | Pencil hardness*1 Marking method JIS method | 2H 3H | 2H~3H 3H | 3H 5H | 3H 5H | 3H 5H | 3H 4H | 3H 4H | 3H 5H | 3H 5H | 2H 4H | H 3H | 3H 4H | 2H~3H 4H | H 3H | 2H 5H | 2H 3H | 3H 4H |
| | T-bending*2 (20° C.) | 4T | 4T | 5T | 5T | 6T | 4T | 5T | 5T | 5T | 5T | OT | 5T | 5T | OT | 2T | 2T | 5T |
| | Stain resistance*3 Felt pen: Black Red | ◎ ◎ | ◎◎ | ◎◎ | ◎◎ | ◎◎ | ◎◎ | ◎◎ | ◎◎ | ◎◎ | ◎◎ | ◎◎ | ◎◎ | ◎◎ | ◎◎ | ◎◎ | ◎◎ | ◎◎ |
| | Solvent tolerance*4 xylene rubbing(50 times) | Passed | Passed | Passed | Passed | Passed | Passed | Passed | Passed | Passed | Passed | Passed | Passed | Passed | Passed | Passed | Passed | Passed |

Evaluation Method:
*1Pencil hardness Marking method: In accordance with the method of JIS-K-5400, a pencil is moved horizontally on the surface of the film. The surface is wiped with a wad of sanitary cotton. The result is expressed in the hardness of the pencil which left no marking on the film surface.
JIS method: Based on JIS-K-5400
*2T-bending: With one or more iron sheets of the same thickness as the test piece sandwiched, each test piece is bent through 180° under a pressure of 50 KgG/cm² applied with hand-press at the bend is macroscopically examined through a magnifying glass of 30 times. The T-bending is shown in terms of the minimum number of the iron sheets causing no cracks in the testpiece.
*3Stain resistance: With a felt pen is drawn lines on the surface of the test film, which is left standing for 24 hours. The lines are wiped with a wad of sanitary cotton saturated with ethanol. The trace of the lines is examined for evaluation.
◎: no trace
○: slightly traced
△: traced to some extent
X: apparent trace
*4Solvent tolerance: A textile swab impregnated with xylene is reciprocated in contact with coated surface of the testpiece with a constant force. The evaluation is made whether 50 reciprocations cause tears on the surface or not.

What is claimed is:

1. A one-can thermosetting resin composition comprising (A) a blocked product of hexamethylene diisocyanate or bis(isocyanatomethyl)cyclohexane, or a blocked product of an adduct of hexamethylene diisocyanate or bis(isocyanatomethyl)cyclohexane and (B) a polyester polyol having at least three functional groups.

2. A resin composition as claimed in claim 1, wherein the polyester polyol (B) has a number-average molecular weight of 600 to 3500 and a hydroxyl value of 40 to 460.

3. A resin composition as claimed in claim 1, wherein the ratio of the component (A) and the component (B) is ½ to 2/1 in terms of OH/regenerated isocyanate groups equivalent ratio.

4. A resin composition as claimed in claim 1, wherein the blocked product (A) is one prepared by the reaction of 1,3-bis(isocyanato methyl) cyclohexane, a polyesterpolyol prepared by condensation of adipic acid, ethylene glycol, trimethylol propane and dipropylene glycol and methyl ethyl ketoxime and the polyester polyol (B) is one prepared by the reaction of succinic acid with propylene glycol and trimethylol propane.

5. A resin composition as claimed in claim 1, wherein the polyester polyol (B) is one prepared by the reaction of succinic acid with ethylene glycol and trimethylol propane and the blocked product (A) is one prepared by the reaction of hexamethylene diisocyanate with methyl ethyl ketoxime.

6. Precoated metal, which is prepared by coating a metal plate with a one-can thermosetting resin composition comprising (A) a blocked product of hexamethylene diisocyanate or bis(isocyanatomethyl)cyclohexane, or a blocked product of an adduct of hexamethylene diisocyanate or bis(isocyanatomethyl)cyclohexane and (B) a polyester polyol having at least three functional groups and heating the thus coated metal plate to cause the coated material to cure.

7. Precoated metal as claimed in claim 6, wherein the polyester polyol (B) has a number-average molecular weight of 600 to 3500 and a hydroxyl value of 40 to 460.

8. Precoated metal as claimed in claim 6, wherein the ratio of the component (A) and the component (B) is ½ to 2/1 in terms of OH/regenerated isocyanate groups equivalent ratio.

9. Precoated metal as claimed in claim 6, wherein the blocked product (A) is one prepared by the reaction of 1,3-bis(isocyanato methyl) cyclohexane, a polyesterpolyol prepared by condensation of a mixture of adipic acid, ethylene glycol, trimethylol propane and dipropylene glycol and methyl ethyl ketoxime and the polyester polyol (B) is one prepared by the reaction of succinic acid with propylene glycol and trimethylol propane.

10. Precoated metal as claimed in claim 6, wherein the blocked product (A) is one prepared by the reaction of hexamethylene diisocyanate with methyl ethyl ketoxime and the polyester polyol (B) is one prepared by the reaction of succinic acid with ethylene glycol ad trimethylol propane.

11. Precoated metal as claimed in claim 6, wherein the heat metal temperature is 150° to 350° C. and the heating time is in the range of from 20 to 120 seconds.

* * * * *